(12) United States Patent
Cheng et al.

(10) Patent No.: US 12,389,091 B2
(45) Date of Patent: Aug. 12, 2025

(54) PHOTO DETECTOR

(71) Applicant: InnoCare Optoelectronics Corporation, Tainan (TW)

(72) Inventors: Sung-Pao Cheng, Tainan (TW); Hsin-Lin Lo, Tainan (TW)

(73) Assignee: InnoCare Optoelectronics Corporation, Tainan (TW)

( * ) Notice: Subject to any disclaimer, the term of this patent is extended or adjusted under 35 U.S.C. 154(b) by 122 days.

(21) Appl. No.: 18/366,703

(22) Filed: Aug. 8, 2023

(65) Prior Publication Data
US 2024/0080537 A1 Mar. 7, 2024

(30) Foreign Application Priority Data
Sep. 7, 2022 (TW) ................. 111209748

(51) Int. Cl.
*H04N 23/30* (2023.01)
*H04N 23/54* (2023.01)

(52) U.S. Cl.
CPC ............. *H04N 23/30* (2023.01); *H04N 23/54* (2023.01)

(58) Field of Classification Search
USPC ....................................................... 348/162
See application file for complete search history.

(56) References Cited

U.S. PATENT DOCUMENTS

| | | | | |
|---|---|---|---|---|
| 6,832,729 B1* | 12/2004 | Perry | ...................... | G06K 7/12 235/491 |
| 2005/0072935 A1* | 4/2005 | Lussier | .............. | G01N 21/6486 250/458.1 |
| 2006/0169907 A1* | 8/2006 | Shinden | ............... | H04N 23/651 250/370.09 |
| 2010/0207024 A1* | 8/2010 | Thiele | .................... | G03B 17/00 250/330 |
| 2010/0284521 A1* | 11/2010 | McBroom | ............ | A61B 6/4233 378/204 |
| 2015/0192286 A1* | 7/2015 | Hansen | .................... | F21L 4/027 362/373 |
| 2015/0373482 A1* | 12/2015 | Barnard | .................. | H04W 4/40 370/338 |
| 2017/0168496 A1* | 6/2017 | Yamamoto | ........... | G05D 1/0212 |
| 2019/0041271 A1* | 2/2019 | Preston | .................. | G01K 1/026 |
| 2020/0003628 A1* | 1/2020 | Preston | .................. | G01K 13/00 |
| 2020/0081369 A1* | 3/2020 | Kojima | ................ | G03G 15/065 |
| 2020/0330321 A1* | 10/2020 | Wersland | ............... | A61H 23/00 |
| 2022/0143463 A1* | 5/2022 | Campanaro | ........ | A63B 22/0087 |
| 2023/0049899 A1* | 2/2023 | Yeh | ..................... | G02B 27/0093 |
| 2023/0370573 A1* | 11/2023 | Maddox | ................ | H04N 7/183 |

* cited by examiner

*Primary Examiner* — Peet Dhillon
(74) *Attorney, Agent, or Firm* — JCIPRNET

(57) ABSTRACT

A photo detector including a photo sensor part and a power source module is provided. The power source module is fixed on the photo sensor part and electrically connected to the photo sensor part. The power source module is detachable and includes a handle.

18 Claims, 6 Drawing Sheets

PHOTO DETECTOR

CROSS-REFERENCE TO RELATED APPLICATION

This application claims the priority benefit of Taiwan application serial no. 111209748, filed on Sep. 7, 2022. The entirety of the above-mentioned patent application is hereby incorporated by reference herein and made a part of this specification.

BACKGROUND

Technical Field

The disclosure relates to an electronic device, and particularly relates to a photo detector.

Description of Related Art

Portable design allows an electronic device to provide more convenient operations. However, the portable design also makes it impossible for the electronic device to be continuously connected to a power source, and thus a usage time is limited.

SUMMARY

The disclosure is directed to a photo detector including a photo sensor part and a power source module. The power source module is fixed on the photo sensor part and is electrically connected to the photo sensor part. The power source module is detachable, and the power source module includes a handle.

According to an embodiment of the disclosure, the power source module includes a battery and a first interface. The first interface is electrically connected to the battery, and the first interface is used for transmitting an external power source to charge the battery.

According to an embodiment of the disclosure, the power source module further includes a second interface. The second interface is electrically connected to the battery, and the second interface is used for transmitting a power source provided by the battery.

According to an embodiment of the disclosure, at least one of the first interface and the second interface is a USB interface.

According to an embodiment of the disclosure, the photo detector further includes a connector. The photo sensor part is electrically connected to the power source module through the connector.

According to an embodiment of the disclosure, the power source module includes a protruding structure, and the photo sensor part includes a concave structure. The protruding structure is disposed in the concave structure, so that the power source module is fixed on the photo sensor part.

According to an embodiment of the disclosure, the power source module includes a battery and a display unit. The display unit is electrically connected to the battery, and the display unit is used for displaying a power level of the battery.

According to an embodiment of the disclosure, the power source module further includes a controller electrically connected between the battery and the display unit.

According to an embodiment of the disclosure, the power source module includes an analog-to-digital signal converter electrically connected between the battery and the controller.

According to an embodiment of the disclosure, the photo sensor part includes an electrical storage unit, and the electrical storage unit is electrically connected to the power source module to receive a power source.

DESCRIPTION OF THE EMBODIMENTS

Figure 1:
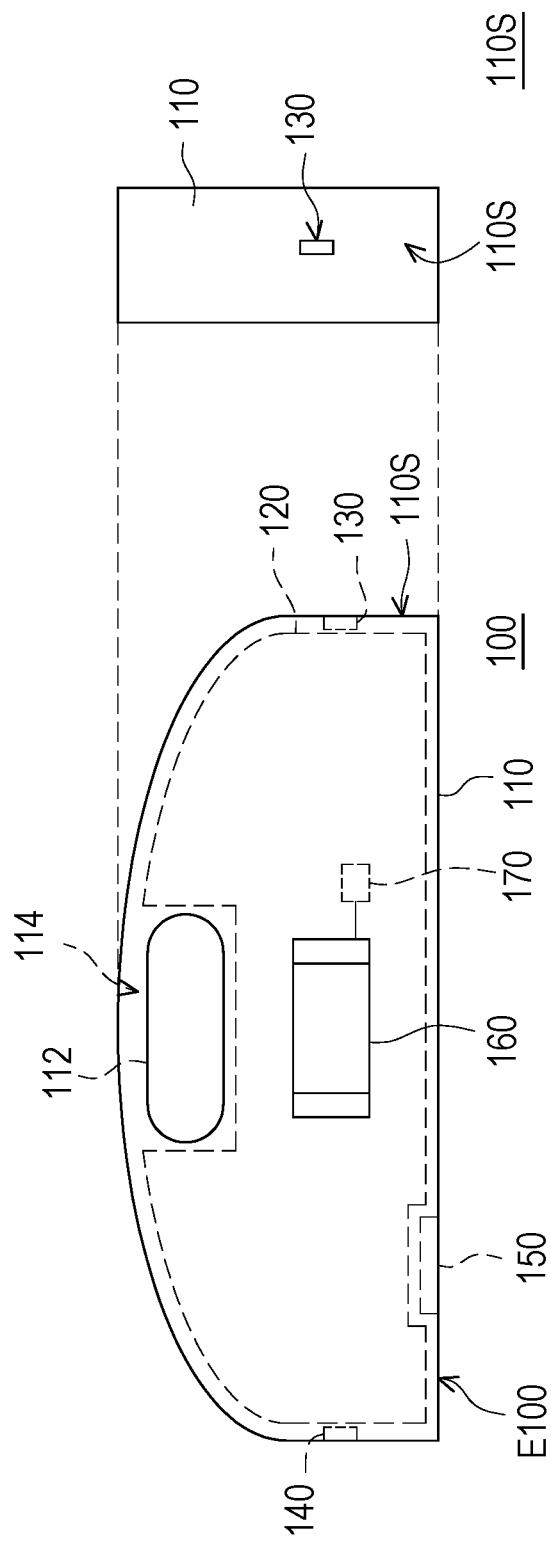
FIG. 1 is a diagram of a power source module for a photo detector according to some embodiments of the disclosure.

The disclosure may be understood by referring to the following detailed description in conjunction with the accompanying drawings. It should be noted that, in order to achieve easy understanding of the readers and concise of the drawings, the drawings in the disclosure only depict a part of an electronic device, and specific elements in the drawings are not drawn to actual scales. In addition, the number and size of each element in the figures are for illustration only, and are not intended to limit the scope of the disclosure.

Certain terms are used throughout the specification of the disclosure and the appended claims to refer to specific components. Those skilled in the art should understand that electronic device manufacturers may probably use different names to refer to the same components. This specification is not intended to distinguish between components that have the same function but different names. In the following specification and claims, the terms "including", "containing", "having", etc., are open terms, so that they should be interpreted as meaning of "including but not limited to . . . ". Therefore, when the terms "including", "containing", and/or "having" are used in the description of the disclosure, they specify existence of corresponding features, regions, steps, operations, and/or components, but do not exclude existence of one or more corresponding features, regions, steps, operations, and/or components.

Directional terminology mentioned in the specification, such as "top", "bottom", "front", "back", "left", and "right" merely refer to the directions in the accompanying drawings. Therefore, the used directional terminology is only illustrative, and is not intended to limit the disclosure. In the drawings, the drawings illustrate general characteristics of methods, structures, and/or materials used in specific embodiments. However, these drawings should not be construed as defining or limiting of a scope or nature of the embodiments. For example, for clarity's sake, a relative size, thickness, and location of each film layer, area and/or structure may be reduced or enlarged.

When a corresponding component (for example, a film layer or an area) is described as being "disposed on another component", the component may be directly disposed or formed on another component, or other components probably exist therebetween. On the other hand, when a component is described as being "directly disposed on another component", none other component exits therebetween. Moreover, when a component is described as being "disposed on another component", the two components have a vertical relationship in a top view direction, and this component may be above or below the another component, and the vertical relationship depends on an orientation of the device.

It should be understood that when a component or a film layer is described as being "connected to" another component or film layer, it may be directly connected to the another component or film layer, or there is an intervening component or film layer therebetween. When a component is described as being "directly connected" to another component or film layer, there is no intervening component or film layer therebetween. Moreover, when a component is described as being "coupled to another component (or a variant thereof)", the component may be directly connected to the another component, or indirectly connected (for example, electrically connected) to the another component through one or more components.

The terms "about", "equal to", "equivalent" or "identical", "substantially" or "approximately" are generally interpreted as being within a range of 20% of a given value or range, or as being within a range of 10%, 5%, 3%, 2%, 1%, or 0.5% of the given value or range.

The ordinal numbers used in the specification and claims, such as "first" and "second" are used to modify components, and do not imply and represent the component or these components have any previous ordinal numbers, and do not represent a sequence of one component with another, or a sequence in a manufacturing method. The use of these ordinal numbers is only to make a clear distinction between a component with a certain name and another component with the same name. The same terms may not be used in the claims and the specification, and accordingly, a first component in the specification may be a second component in the claims.

In the disclosure, any two values or directions used for comparison may have certain errors. If the first value is equal to the second value, it implies that there may be an error of about 10% between the first value and the second value; if the first direction is perpendicular to the second direction, an angle between the first direction and the second direction may be between 80 degrees and 100 degrees; and if the first direction is parallel to the second direction, the angle between the first direction and the second direction may be between 0 degree and 10 degrees.

It should be noted that, in the following embodiments, the features of several different embodiments may be replaced, reorganized, and mixed to complete other embodiments without departing from the spirit of the disclosure. As long as the features of the various embodiments do not violate the spirit of the disclosure or conflict with each other, they may be mixed and matched arbitrarily.

FIG. 1 is a diagram of a power source module for a photo detector according to some embodiments of the disclosure. In FIG. 1, a power source module 100 has a casing 110. In some embodiments, a material of the casing 110 may include plastic, ceramic, metal, alloy, other suitable materials, or a combination thereof. The casing 110 may have at least one opening 112, and the opening 112 and a part of the casing 110 surrounding the opening 112 may be regarded as a handle 114, so that the power source module 100 includes the handle 114. In some embodiments, a shape of the handle 114 may be designed according to different requirements. For example, the opening 112 may have a wavy shape, a circular shape, a rectangular shape, a polygonal shape or other suitable shapes for a user to grasp. In some embodiments, one side of the casing 110 of the power source module 100 has an arc-shaped edge, and the side is adjacent to the opening 112, but the disclosure is not limited thereto. In the embodiment, the power source module 100 includes a battery 120. The battery 120 may be disposed inside the casing 110 and covered by the casing 110. The battery 120 may be used to provide sufficient electrical storage capacity. Referring to FIG. 1, an installation area of the battery 120 is shown by dotted lines. The larger a volume of the battery 120 is, the higher the battery capacity is, but the disclosure is not limited thereto. The battery 120 may be a battery of various forms, including, for example, a wet battery, a dry battery, a fuel battery, a solar battery, or a combination thereof. In some embodiments, the battery 120 may include a rechargeable battery or a secondary battery, such as, a lead battery, a nickel cadmium (Ni Cd) battery, a nickel iron battery, a nickel-metal hydride battery (Ni MH), a lithium ion battery (Li Ion), a rechargeable alkaline battery, a silver zinc battery, a solid-state battery, etc., but the disclosure is not limited thereto. In some embodiments, the battery 120 may be formed by a plurality of battery cells connected in parallel or in series, but the disclosure is not limited thereto.

In the embodiment, the power source module 100 includes the battery 120 and a first interface 130. The first interface 130 may be electrically connected to the battery 120, and the first interface 130 is configured to transmit an external power source (not shown) to charge the battery 120. In other embodiments (not shown), the power source module 100 may include a plurality of first interfaces 130 adjacent to or separated from each other. In some embodiments, as shown in a right half of FIG. 1, a side surface 110S of the casing 110 is shown, the first interface 130 may be disposed on the side surface 110S of the casing 110 for a corresponding connection structure to connect, but the disclosure is not limited thereto. In other embodiments, the first interface 130 may be provided on other surfaces of the casing 110. In some embodiments, the first interface 130 is, for example, a universal serial bus (USB) interface, for which a USB connector may be inserted into the first interface 130, but the disclosure is not limited thereto. A type of the USB interface may include type-A USB interface, type-B USB interface, type-C USB interface, mini-A USB interface, mini-B USB interface, micro-A USB interface, micro-B USB interface, lightning interface, USB 3.0 interface, etc., but the disclosure is not limited thereto. In some embodiments, a transmission line may be provided to connect between the first interface 130 and the external power source (such as an external battery, an external power supply socket, etc.), so as to provide power to the battery 120 of the power source module 100 through the transmission line to realize charging, but the disclosure is not limited thereto.

In the embodiment, the power source module 100 further includes a second interface 140. The second interface 140 may be electrically connected to the battery 120, and the second interface 140 is configured to transmit a power source provided by the battery 120. The second interface 140 may be disposed on the side surface 110S of the casing 110. In other embodiments, the second interface 140 may be disposed on other surfaces of the casing 110. In FIG. 1, the first interface 130 and the second interface 140 may be disposed on two opposite side surfaces of the power source module 100, but the disclosure is not limited thereto. In some embodiments, the first interface 130 and the second interface 140 may be disposed adjacent to each other. In other embodiments (not shown), the power source module 100 may include a plurality of second interfaces 140 adjacent to or separated from each other. In some embodiments, the second interface 140 is, for example, a USB interface, for which a USB connector may be inserted into the second interface 140, but the disclosure is not limited thereto. In some embodiments, at least one of the first interface 130 and the second interface 140 is a USB interface. In some embodiments, the first interface 130 and the second interface 140 may be different types of USB interfaces. For example, a transmission line may be inserted between the second interface 140 and an external device (not shown) to transmit the power source of the battery 120 to the external device, but the disclosure is not limited thereto. The first interface 130 and the second interface 140 may be used for charging and discharging the battery 120, respectively.

In the embodiment, the power source module 100 further includes a first connecting member 150 disposed in the casing 110 and adjacent to a connecting edge E100 of the casing 110. The first connecting member 150 may have an electrical transmission property, and may be electrically connected to the battery 120 to provide the power source of the battery 120 to devices outside the power source module 100. The first connecting member 150 may have a magnetic attraction property so as to be attached to a corresponding device. In the embodiment, the power source module 100 further includes a display unit 160. The display unit 160 is electrically connected to the battery 120, and the display unit 160 may be used to display a power level of the battery 120. The display unit 160 may include a display panel, or may be a light-emitting unit, but the disclosure is not limited thereto. In some embodiments, the power source module 100 may further include a controller 170. The controller 170 is electrically connected between the battery 120 and the display unit 160, and the controller 170 may read the power level of the battery 120 and display the power level of the battery 120 on the display unit 160. In some embodiments, the controller 170 may include a micro control unit (MCU), but the disclosure is not limited thereto. The controller 170 in FIG. 1 is only schematically indicated, and a dashed box labeled with 170 is not used to represent an actual outline and position of the controller. In some embodiments, the controller 170 may be a control circuit integrated with the display unit 160, a control circuit integrated with the battery 120, or may be an independent circuit element. In some embodiments, the power source module 100 may further include an analog-to-digital signal converter (ADC) not shown in FIG. 1, and the ADC may be electrically connected between the battery 120 and the controller 170 for implementing signal conversion.

In the embodiment, the power source module 100 may have a connecting edge E100, and a shape of the connecting edge E100 may be designed according to the connected photo sensor part. In FIG. 1, the connecting edge E100 is, for example, a straight edge, but the disclosure is not limited thereto. In some embodiments, the first interface 130 and/or the second interface 140 may not be on the connecting edge E100. In some embodiments, the first connecting member 150 may be disposed on the connecting edge E100.

Figure 2:
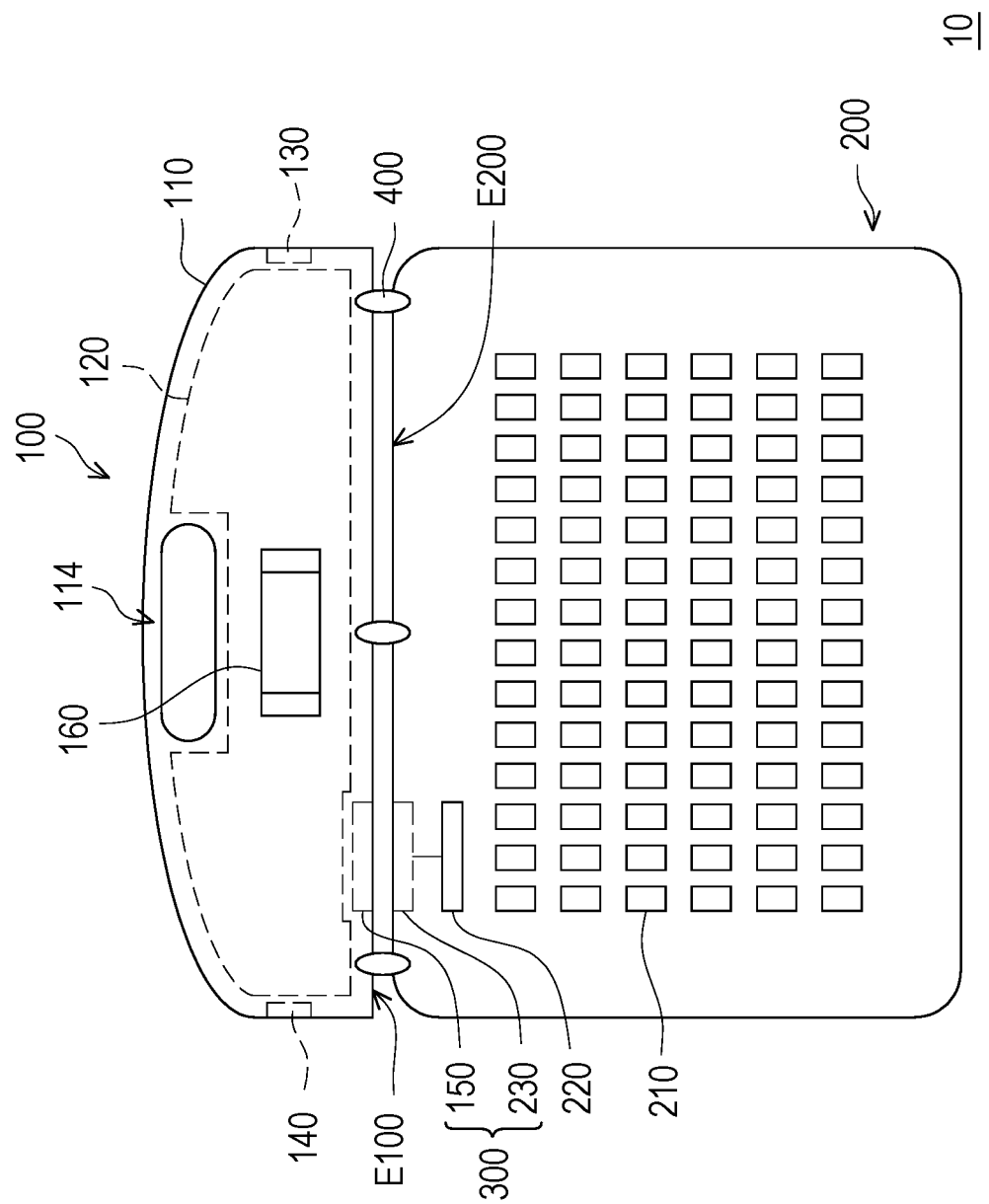
FIG. 2 is a schematic diagram of a photo detector according to an embodiment of the disclosure.

FIG. 2 is a schematic diagram of a photo detector according to an embodiment of the disclosure. In FIG. 2, a photo detector 10 includes a power source module 100 and a photo sensor part 200. The power source module 100 is fixed on the photo sensor part 200 to constitute the photo detector 10 of the embodiment. The power source module 100 may be electrically connected to the photo sensor part 200. Specifically, the power source module 100 may be used to provide a power source to the photo sensor part 200. In addition, the power source module 100 fixed on the photo sensor part 200 may be detachable, i.e., the power source module 100 may be fixed on the photo sensor part 200 or removed from the photo sensor part 200 according to requirements. In some embodiments, the photo sensor part 200 may be combined with other devices, such as a light source module, to realize photo detection, but the disclosure not limited thereto.

In the embodiment, the power source module 100 includes a casing 110 provided with a handle 114, a battery 120, a first interface 130, a second interface 140, a first connecting member 150 and/or a display unit 160, but the disclosure is not limited thereto. Here, a specific structure and composition of the power source module 100 may be substantially inferred by referring to the related description of FIG. 1. In the embodiment, the power source module 100 fixed to the photo sensor part 200 includes the handle 114. The user may move the photo detector 10 by holding the handle 114. Therefore, the photo detector 10 has a design that is easy to carry and move, thereby improving the convenience of use.

In some embodiments, the power source module 100 may be fixed to the photo sensor part 200 in such a way that the connecting edge E100 of the power source module 100 is adjacent to one of a plurality of edges of the photo sensor part 200, such as a connecting edge E200, but the disclosure is not limited thereto. In some embodiments, a length of the connecting edge E100 may be approximately equal to, but not limited to, the connecting edge E200. In some embodiments, the length of the connecting edge E100 may be different from that of the connecting edge E200. In some embodiments, the connecting edge E100 may be substantially parallel to the connecting edge E200, but the disclosure is not limited thereto. In other embodiments (not shown), the connecting edge E100 and the connecting edge E200 may have curved edges or other shaped edges. In other embodiments (not shown), the shapes of the connecting edge E100 and the connecting edge E200 may be substantially complementary in design. The connection edge E100 of the power source module 100 and the connection edge E200 of the photo sensor part 200 may be closely adjacent to each other.

The photo sensor part 200 includes a plurality of photo sensor units 210. The plurality of photo sensor units 210 may be arranged in an array or in other manners. The photo sensor units 210 may be used to receive electromagnetic waves of a specific wavelength, and the photo sensor part 200 may obtain a corresponding sensing image according to an intensity and a distribution of the received electromagnetic waves. In some embodiments, the photo sensor units 210 may be used for receiving X-rays, and the photo detector 10 may be used in a field of X-ray image sensing, but the disclosure is not limited thereto. In some embodiments, the photo sensor part 200 may be used together with an X-ray light source to realize X-ray image sensing.

The photo sensor part 200 further includes an electrical storage unit 220, and the electrical storage unit 220 is electrically connected to the power source module 100 to receive a power source. The power stored in the electrical storage unit 220 may be supplied to the photo sensor unit 210 to perform sensing. Therefore, the photo sensor part 200 may perform photo detection without being directly connected to an external power source. In other words, the photo sensor part 200 is a portable photo sensor part. In some embodiments, the photo sensor part 200 may be applied in a medical imaging field to provide instant and convenient image sensing operations, but the disclosure is not limited thereto. For example, in an outdoor environment without an external power supply, the photo sensor part 200 may still capture required medical images to provide real-time detection.

In some embodiments, the photo sensor part 200 further includes a second connecting member 230. The second connecting member 230 is suitable for docking with the first connecting member 150 on the power source module 100 to form a connector 300. Specifically, the photo detector 10 further includes the connector 300, and the photo sensor part 200 may be electrically connected to the power source module 100 through the connector 300. In some embodiments, the second connecting member 230 may be electrically connected to the electrical storage unit 220, and the photo sensor part 200 may receive the power source provided by the battery 120 in the power source module 100 via the connector 300. In some embodiments, the connector 300 may be used to transmit a power level signal of the electrical storage unit 220 of the photo sensor part 200 to the power source module 100, and the power level of the photo sensor part 200 may be displayed on the display unit 160 of the power source module 100, but the disclosure is not limited thereto.

In some embodiments, the second connecting member 230 may be disposed adjacent to the connecting edge E200 of the photo sensor part 200, and the second connecting member 230 may have a design corresponding to the first connecting member 150. In some embodiments, the method for fixing the power source module 100 to the photo sensor part 200 is, for example, to connect the first connecting member 150 with the second connecting member 230. The second connecting member 230 may have a magnetic attraction property to attract the first connecting member 150. For example, the second connecting member 230 may have a magnetic attraction material, and the magnetic attraction material may be exposed at the connecting edge E200 to attract the magnetic attraction material of the first connecting member 150 to each other.

In some embodiments, the second connecting member 230 may have electrical transmission properties and may be electrically connected to the electrical storage unit 220. In some embodiments, when the power source module 100 is fixed on the light detection component 200, the second connecting member 230 may receive the power source provided by the power source module 100 through the first connecting member 150 and transmit the received power source to the electrical storage unit 220. In this way, the power source module 100 may charge the photo sensor part 200 through the connector 300. The power source module 100 may provide power source to the photo sensor part 200, so that the photo detector 10 may have a longer operating time.

In FIG. 2, when the power source module 100 is fixed to the photo sensor part 200, the first interface 130 and the second interface 140 may still be connected to other external devices to realize functions of charging the battery 120 and charging other devices.

The photo detector 10 may include a detachable connection structure 400. The detachable connection structure 400 may be disposed between the connecting edge E100 of the power source module 100 and the connection edge E200 of the photo sensor part 200. In some embodiments, the detachable connection structure 400 may be formed by corresponding structures disposed on the power source module 100 and the photo sensor part 200. The detachable connection structure 400 may stably fix the power source module 100 to the photo sensor part 200, and may separate the power source module 100 from the photo sensor part 200 when necessary. In some embodiments, the detachable connecting structure 400 may include two parts, and the two parts may be structures mutually engaged with each other, but the disclosure is not limited thereto.

Figure 3B:
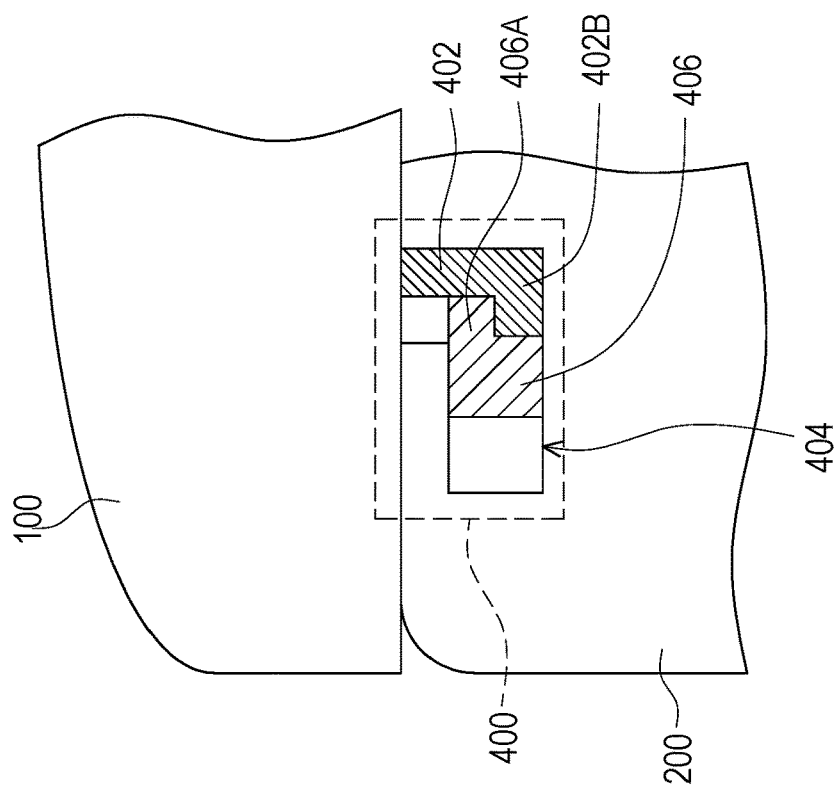
FIG. 3A and FIG. 3B are schematic diagrams of a detachable connection structure according to an embodiment of the disclosure.
Figure 3A:
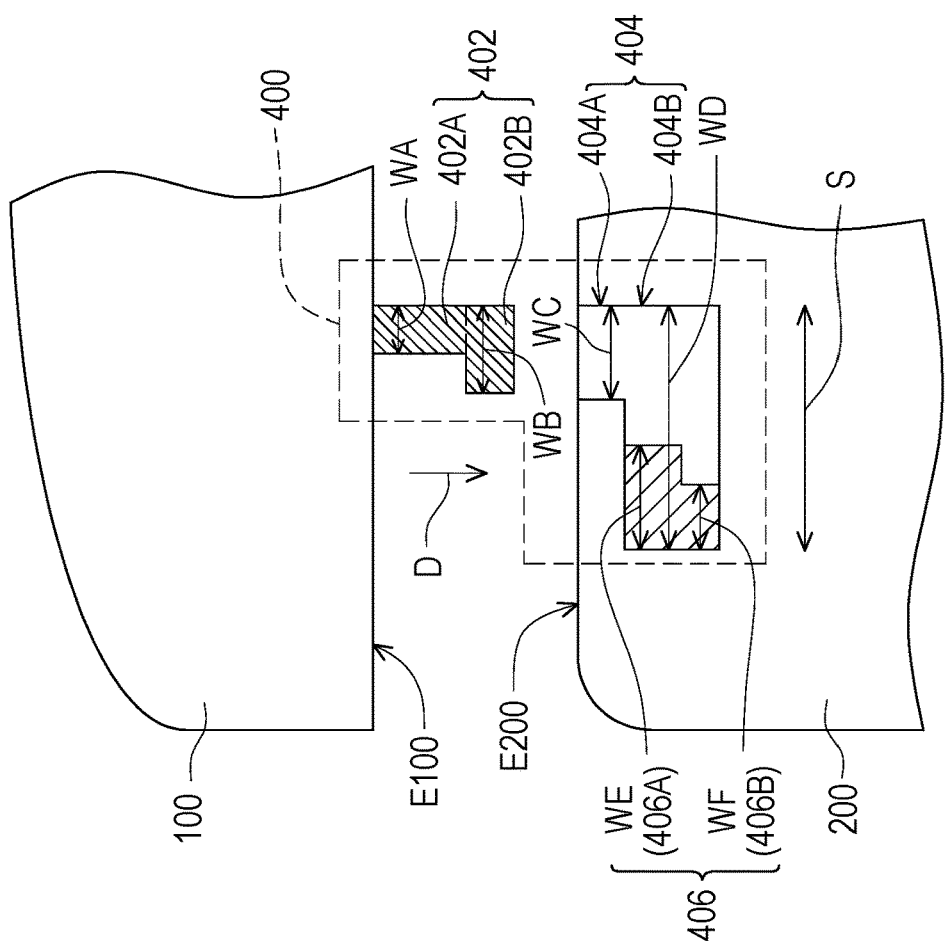

FIG. 3A and FIG. 3B are schematic diagrams of a detachable connection structure according to an embodiment of the disclosure. In FIG. 3A and FIG. 3B, the power source module 100 includes a protruding structure 402, the photo sensor part 200 includes a recessed structure 404 (for example, a card slot), and the protruding structure 402 is set in the recessed structure 404 to fix the power source module 100 on the photo sensor part 200. In detail, a part of the protruding structure 402 may be disposed in or embedded in the recessed structure 404 to fix the power source module 100 on the photo sensor part 200. For example, the protruding structure 402 may be moved toward an assembling direction D to be disposed in the recessed structure 404, so that the power source module 100 is fixed to the photo sensor part 200. The connecting edge E100 of the power source module 100 and the connecting edge E200 of the photo sensor part 200 may be close to each other or even contact each other. In addition, a movable sliding block 406 may be selectively disposed in the recessed structure 404, so that the protruding structure 402, the recessed structure 404 and the sliding block 406 may serve as an implementation of the detachable connection structure 400, but the disclosure is not limited thereto.

As shown in FIG. 3A, the protruding structure 402 may be protruded from the connecting edge E100 of the power source module 100. In some embodiments, the protruding structure 402 may be formed by a protruding portion of the casing of the power source module 100 and has the same material as the casing, but the disclosure is not limited thereto. In some embodiments, the material of the protruding structure 402 may be different from the material of the casing 110. In some embodiments, the protruding structure 402 may be attached to the casing 110 of the power source module 100 by adhering, locking or other bonding manners. In some embodiments, the casing 110 of the power source module 100 may be provided with an accommodating groove, and the protruding structure 402 may be disposed in the accommodating groove or removed from the accommodating groove according to requirements. When the protruding structure 402 is disposed in the accommodating groove, the protruding structure 402, for example, does not protrude from the connecting edge E100, but the disclosure is not limited thereto. As shown in FIG. 3A, when required, the protruding structure 402 may remove out of the accommodating groove to protrude from the connecting edge E100, but the disclosure is not limited thereto. In some embodiments, the protruding structure 402 may be pivoted on the casing of the power source module 100, but the disclosure is not limited thereto. The protruding structure 402 may have an extension portion 402A close to the power source module 100 and/or a hook portion 402B away from the power source module 100. An extending direction of the extension portion 402A may substantially conform to the assembling direction D, and the hook portion 402B is, for example, located at an end of the extension portion 402A. In some embodiments, the protruding structure 402, for example, protrudes out of the connecting edge E100 along the assembling direction D. In some embodiments, in a direction perpendicular to the assembling direction D, a width WA of the extension portion 402A may be, for example, smaller than a width WB of the hook portion 402B to form an L-shaped appearance, but the disclosure is not limited thereto. In other embodiments (not shown), the protruding structure 402, for example, has other shapes, such as T-shape, J-shape or other suitable shapes.

The recessed structure 404 disposed in the photo sensor part 200 may include a first portion 404A (for example, an entrance portion) and a second portion 404B (for example, an accommodating portion). In some embodiments, in the direction perpendicular to the assembling direction D, a width WC of the first portion 404A is, for example, less than or equal to a width WD of the second portion 404B, but the disclosure is not limited thereto. In some embodiments, the width WC of the first portion 404A may be greater than or equal to the width WB of the hook portion 402B of the protruding structure 402, but the disclosure is not limited thereto. Therefore, when the protruding structure 402 moves toward the assembling direction D, the recessed structure 404 may have a sufficient width to accommodate the protruding structure 402. In addition, the width WD of the second portion 404B of the recessed structure 404 may, for example, accommodate the hook portion 402B and/or the sliding block 406 of the protruding structure 402.

In some embodiments, the sliding block 406 accommodated in the recessed structure 404 may have a protruding portion 406A and a base portion 406B. A width WE of the protruding portion 406A may be greater than a width WF of the base portion 406B, so that the sliding block 406 has a substantially complementary contour relative to that of the hook portion 402B of the protruding structure 402, but the disclosure is not limited thereto. The sliding block 406 may be moved in a direction S to change a position. In FIG. 3A, the protruding structure 402 has not been disposed in the groove structure 404, and the sliding block 406 is now, for example, at a position away from the first portion 404A, but the disclosure is not limited thereto. In FIG. 3B, the protrusion structure 402 may be disposed in the groove structure 404. At this time, the sliding block 406 may be moved to a position closer to the first portion 404A, and the protruding portion 406A of the sliding block 406 may, for example, abut against the hook portion 402B of the protruding structure 402, thereby fixing the power source module 100 to the photo sensor part 200, but the disclosure is not limited thereto. In some embodiments, the sliding block 406 may be slid from the position shown in FIG. 3B to the position shown in FIG. 3A, and the protruding structure 402 may be removed from the groove structure 404 to remove the power source module 100, so that the power source module 100 is separated from the photo sensor part 200.

Figure 4:
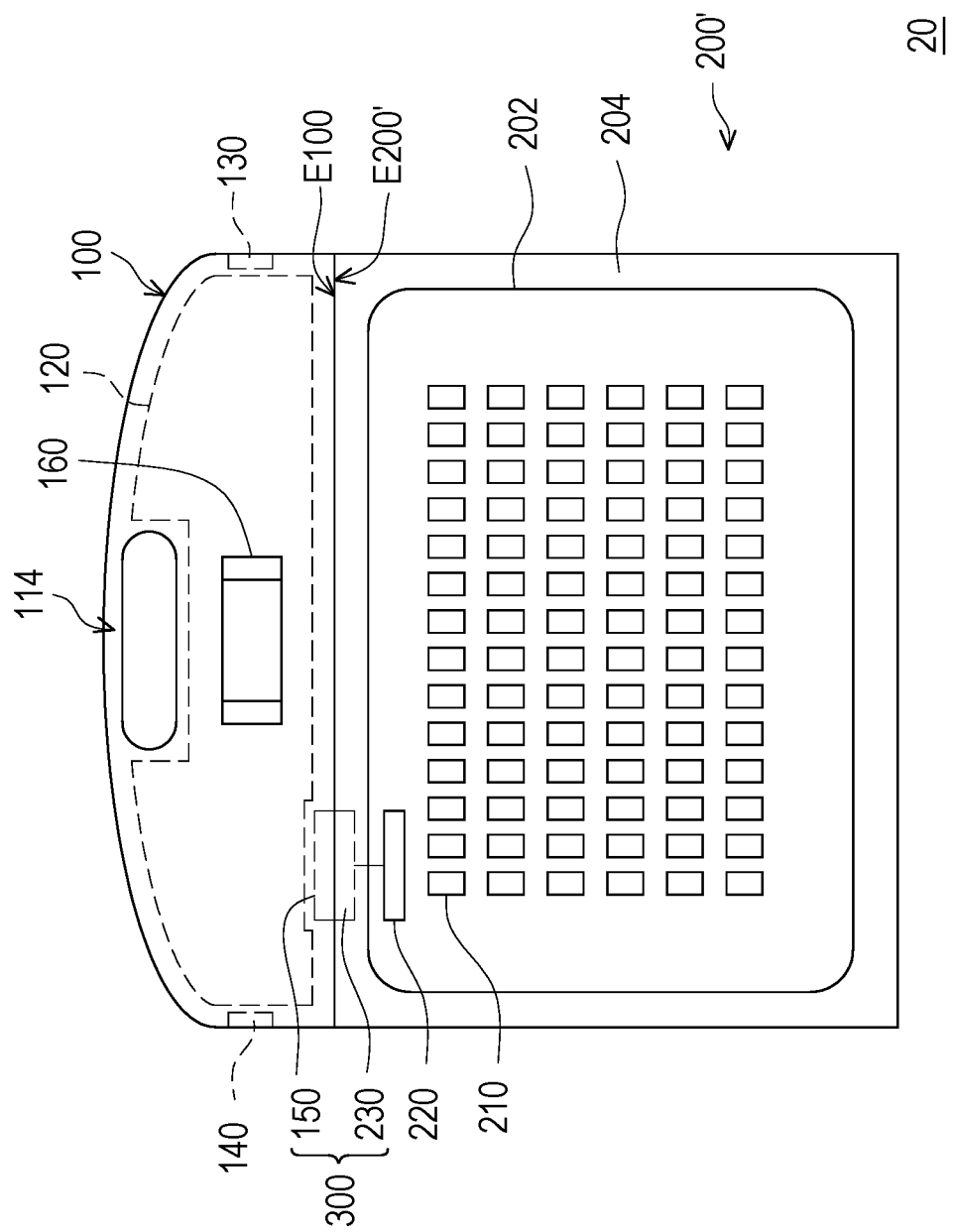
FIG. 4 is a schematic diagram of a photo detector according to an embodiment of the disclosure.

FIG. 4 is a schematic diagram of a photo detector according to an embodiment of the disclosure. In FIG. 4, the photo detector 20 includes the power source module 100 and a photo sensor part 200', where the power source module 100 is detachably fixed to the photo sensor part 200'. The power source module 100 includes the handle 114, the battery 120, the first interface 130, the second interface 140, the first connecting member 150 and/or the display unit 160. Here, the power source module 100 is substantially the same as the power source module 100 in the aforementioned embodiment, so that the description of the power source module 100 in the aforementioned embodiment may be applied and integrated in the embodiment. In some embodiments, the photo sensor part 200' may include a photo sensor panel 202 and a fixing frame 204. The photo sensor panel 202 may include a plurality of photo sensor units 210 and/or an electrical storage unit 220, and description of these components may refer to the corresponding components of the photo sensor part 200 in the aforementioned embodiment. In other words, a difference between the embodiment and the previous embodiment is that the photo sensor part 200' additionally includes the fixing frame 204, and the second connecting member 230 may be disposed on the fixing frame 204, but the disclosure is not limited thereto. Therefore, the same reference numerals in the embodiment as in the previous embodiment denote the same construction, and the two embodiments may refer to each other's descriptions to understand the characteristics of the individual components.

In the embodiment, the fixing frame 204 may be, for example, disposed on at least one side of the photo sensor panel 202. For example, as shown in FIG. 4, the fixing frame 204 may be disposed on all sides of the photo sensor panel 202, the fixing frame 204, for example, surrounds the photo sensor panel 202 to package or protect the photo sensor panel 202. One of a plurality of edges of the fixing frame 204 may be used as a connecting edge E200' of the photo sensor part 200'. The second connecting member 230 may be disposed on the fixing frame 204 and disposed adjacent to the connecting edge E200'. In some embodiments, after the power source module 100 is fixed to the photo sensor part 200, the connecting edge E100 of the power source module 100 may be, for example, close to the connecting edge E200' of the photo sensor part 200', so that the first connecting member 150 is connected to the second connecting member 230 to constitute the connector 300 that is electrically connected between the photo sensor part 200' and the power source module 100.

In some embodiments, the second connecting member 230 may be electrically connected to the electrical storage unit 220 of the photo sensor panel 202. In this way, the photo sensor part 200' may receive the power source provided by the battery 120 in the power source module 100 through the connector 300. In addition, the connector 300 may be selectively used to transmit a power level signal of the photo sensor part 200' to the power source module 100, and the power level of the photo sensor part 200' may be displayed on the display unit 160 of the battery module 100. In some embodiments, the photo sensor part 200' may have an arc edge.

Figure 5:
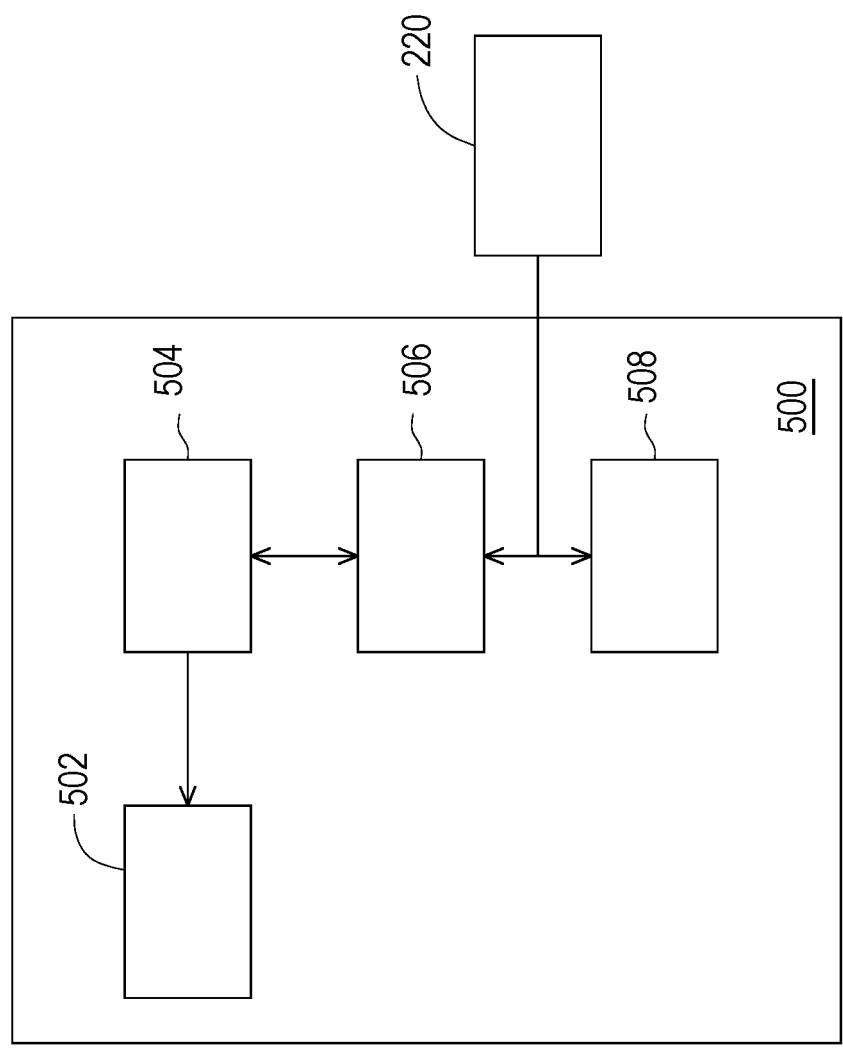
FIG. 5 is a schematic block diagram of some components of a power source module according to an embodiment of the disclosure.

FIG. 5 is a schematic block diagram of some components of a power source module according to an embodiment of the disclosure. In FIG. 5, a power source module 500 may include a display unit 502, a microcontroller (MCU) 504, an analog-to-digital converter (ADC) 506 and/or a battery 508, but the disclosure is not limited thereto. In some embodiments, the display unit 502 is electrically connected to the battery 508, and the display unit 502 is used to display a power level of the battery 508. In some embodiments, the display unit 502 may be electrically connected to the MCU 504. The MCU 504 may be connected to the ADC 506, and the ADC 506 may be connected to the battery 508. In other words, the ADC 506 is electrically connected between the battery 508 and the MCU 504. In some embodiments, a power level signal of the battery 508 may be converted by the ADC 506 and then transmitted to the MCU 504, and the MCU 504 may transmit instructions to the display unit 502, so that the display unit 502 displays the power level signal received by the MCU 504, but the disclosure is not limited thereto. In this way, the power source module 500 may not only store electric energy, but may also display an amount of electric power, so that the user may learn a state of the power source module 500 to determine a timing of charging.

In some embodiments, the power source module 500 may be applied to the aforementioned power source module 100. For example, the display unit 502 may be implemented by the display unit 160 in the aforementioned embodiment. In addition, the battery 508 in the power source module 500 may be the battery 120 in the aforementioned embodiments. In other embodiments, since the power source module 100 of the aforementioned embodiment may be fixed to and electrically connected to the photo sensor part 200 or 200', the design of applying the power source module 500 may be also to read the power level of the electrical storage unit 220 in the photo sensor part 200 or 200' for displaying in the display unit 502. For example, the ADC 506 may be electrically connected to the electrical storage unit 220 through the connector 300 of the aforementioned embodiment, so as to receive the power level signal of the electrical storage unit 220, and convert the power level signal of the electrical storage unit 220 and transmit it to the MCU 504, but the disclosure is not limited thereto. The MCU 504 may provide power level information of the electrical storage unit 220 to the display unit 502, and the display unit 502 displays the power level information. In some embodiments, the display unit 502 may have different display areas, where one display area may be used to display the power level of the battery 120 of the power source module 100, and another display area may be used to display a power level of the electrical storage unit 220 of the photo sensor part 200 or the photo sensor part 200', but the disclosure is not limited thereto. Therefore, when the design of the power source module 500 is applied to the power source module 100 of the photo detector 10 or the photo detector 20, the power level of the battery 120 of the power source module 100 and/or the power level of the power storage unit 220 of the photo sensor part 200 or 200' may be directly read on the display unit 160 of the power source module 100.

Figure 6:
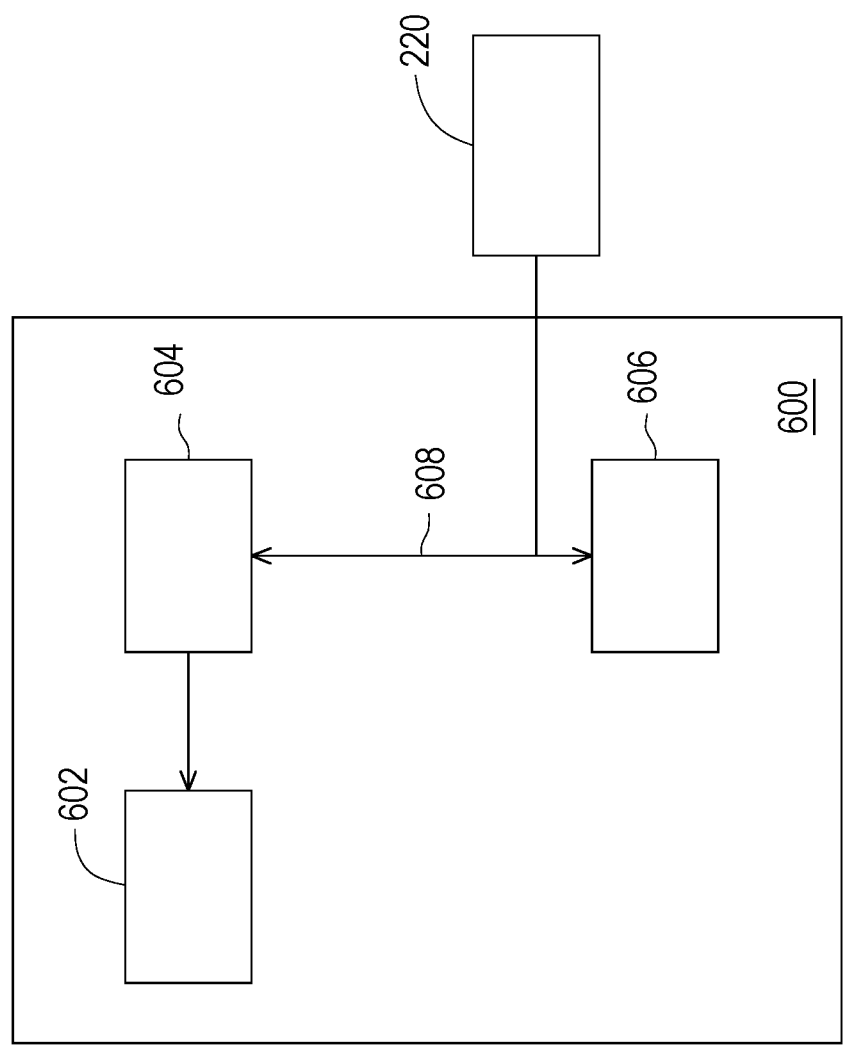
FIG. 6 is a schematic block diagram of some components of a power source module according to an embodiment of the disclosure.

FIG. 6 is a schematic block diagram of some components of a power source module according to an embodiment of the disclosure. In FIG. 6, a power source module 600 may include a display unit 602, a controller 604 (for example, an MCU), and a battery 606, but the disclosure is not limited thereto. The display unit 602 may be electrically connected to the MCU 604. The MCU 604 may be connected between the battery 606 and the display unit 602. In some embodiments, the MCU 604 may be connected to the battery 606 through an Inter-Integrated Circuit (PC) 608. In some embodiments, the MCU 604 may transmit an instruction to the display unit 602 to display a power level signal received by the MCU 604 via the display unit 602. In this way, the power source module 600 may not only store electric energy, but may further display the amount of electric power, so that the user may learn the state of the power source module 600 to determine a timing of charging.

Similar to the power source module 500, the power source module 600 may be applied to the aforementioned power source module 100. For example, the display unit 602 may be implemented by the display unit 160 in the aforementioned embodiment. In addition, the battery 606 in the power source module 600 may be the battery 120 in the aforementioned embodiment. In other embodiments, since the power source module 100 of the aforementioned embodiment may be fixed to and electrically connected to the photo sensor part 200 or the photo sensor part 200', the design of the power source module 600 may also read the power level of the electrical storage unit 220 in the photo sensor part 200 or the photo sensor part 200', and display the same via the display unit 602. For example, the MCU 604 may be electrically connected to the electrical storage unit 220 through the PC 608 and the connector 300 of the aforementioned embodiment, so as to receive the power level signal of the electrical storage unit 220 and provide the power level signal of the electrical storage unit 220 to the display unit 602, and the display unit 602 displays the power level signal of the electrical storage unit 220. In some embodiments, the display unit 602 may have different display areas, where one display area may be used to display the power level of the battery 120 of the power source module 100, and another display area may be used to display a power level of the electrical storage unit 220 of the photo sensor part 200 or the photo sensor part 200', but the disclosure is not limited thereto. Therefore, when the design of the power source module 600 is applied to the power source module 100 of the photo detector 10 or the photo detector 20, the power level of the battery 120 of the power source module 100 and/or the power level of the power storage unit 220 of the photo sensor part 200 or 200' may be directly read on the display unit 160 of the power source module 100.

In summary, the photo detector of the disclosure includes the power source module and the photo sensor part. The photo sensor part is a portable device, so that the power source module may be used to charge the photo sensor part to prolong an operating time of the photo sensor part. In some embodiments, the power source module fixed on the photo sensor part may be detached without limiting the use of the photo sensor part. In addition, the power source module may charge other external devices besides the photo sensor part to provide multiple charging functions. In some embodiments, the display unit disposed on the power source module may display the power level of the power source module itself as well as the power level of the photo sensor part, so that the user may conveniently observe the power level of the photo detector. In some embodiments, the battery module has the handle, so that the photo detector is easy to carry and move.

What is claimed is:

1. A photo detector, comprising:
   a photo sensor part; and
   a power source part, fixed on the photo sensor part, and electrically connected to the photo sensor part, wherein the power source part comprises a casing detachably fixed to the photo sensor part, the casing has at least one opening, and a part of the casing surrounding the opening forms a handle.

2. The photo detector according to claim 1, wherein the power source part comprises a battery and one or more interface, the one or more interface is electrically connected to the battery.

3. The photo detector according to claim 2, wherein at least one of the one or more interface is a USB interface.

4. The photo detector according to claim 1, further comprising a connector, wherein the photo sensor part is electrically connected to the power source part through the connector.

5. The photo detector according to claim 1, wherein the power source part comprises a protruding structure, the photo sensor part comprises a concave structure, and the protruding structure is disposed in the concave structure so that the power source part is fixed on the photo sensor part.

6. The photo detector according to claim 1, wherein the power source part comprises a battery and a display unit, the display unit is electrically connected to the battery, and the display unit is used for displaying a power level of the battery.

7. The photo detector according to claim 6, wherein the power source part further comprises a controller electrically connected between the battery and the display unit.

8. The photo detector according to claim 7, wherein the power source part comprises an analog-to-digital signal converter electrically connected between the battery and the controller.

9. The photo detector according to claim 1, wherein the photo sensor part comprises an electrical storage unit, and the electrical storage unit is electrically connected to the power source part to receive a power source.

10. The photo detector according to claim 1, wherein the power source part comprises a battery and a first interface, the first interface is electrically connected to the battery, and the first interface is disposed on a side surface of the casing.

11. The photo detector according to claim 10, wherein the power source part further comprises a second interface, and the first interface and the second interface are disposed on two opposite side surfaces of the casing.

12. The photo detector according to claim 1, wherein the casing has a connecting edge, and the connecting edge is adjacent to one of edges of the photo sensor part.

13. The photo detector according to claim 1, wherein a battery is covered by the casing.

14. The photo detector according to claim 1, wherein the photo sensor part comprises a plurality of photo sensor units arranged in an array.

15. The photo detector according to claim 14, wherein the photo sensor units are used for receiving X-rays.

16. The photo detector according to claim 1, wherein the power source part further comprises a first connecting member, the photo sensor part comprises a second connecting member, and the second connecting member is suitable for docking with the first connecting member.

17. The photo detector according to claim 16, wherein the second connecting member has a magnetic attraction material.

18. The photo detector according to claim 16, wherein the photo sensor part comprises a photo sensor panel and a fixing frame, the fixing frame surrounds the photo sensor panel, and the second connecting member is disposed on the fixing frame.

* * * * *